(12) United States Patent
Yoshida et al.

(10) Patent No.: US 6,711,220 B1
(45) Date of Patent: Mar. 23, 2004

(54) BIT POSITION SYNCHRONIZER

(75) Inventors: Akira Yoshida, Tokyo (JP); Takashi Taya, Tokyo (JP); Shuichi Matsumoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/577,845

(22) Filed: May 25, 2000

(30) Foreign Application Priority Data

May 28, 1999 (JP) ............................................ 11-149491

(51) Int. Cl.[7] .............................................. H04L 7/00
(52) U.S. Cl. ...................................... 375/354; 375/371
(58) Field of Search ................................. 375/376, 373, 375/220, 371, 354, 375; 714/400

(56) References Cited

U.S. PATENT DOCUMENTS 5,778,214 A * 7/1998 Taya et al. .................. 713/400
5,920,600 A * 7/1999 Yamaoka et al. ........... 375/376

FOREIGN PATENT DOCUMENTS

JP          09162853         6/1997

* cited by examiner

Primary Examiner—Stephen Chin
Assistant Examiner—Curtis Odom
(74) Attorney, Agent, or Firm—Venable LLP; Michael A. Sartori

(57) ABSTRACT

A bit position synchronizer including a sampling circuit which samples an input signal based on a plurality of phases of clock signals to obtain a plurality of sampled signals, a selector which selects one of the plurality of sampled signals, each of which is delayed for a short period, based on a selection signal and which outputs an output signal, a detection circuit which detects a first changing point and a second changing point of the sampled signals, a first register which stores a first value for the first changing point, a second register which stores a second value for the second changing point and a third register which stores an intermediate value between the first and second values and which outputs the selection signal.

15 Claims, 5 Drawing Sheets

BIT POSITION SYNCHRONYZER

EXAMPLE FOR INPUT SIGNAL

TIME CHART OF MULTI-PHASE SAMPLING CIRCUIT

Fig. 4

| INPUT CONDITION | OUTPUT NUMBER |
|---|---|
| $A_k \oplus A_{k+1} = 1$<br>K: INTEGER $1 \leq k \leq n-1$ | k |
| $A_n \oplus A_1 = 1$ | n |
| OTHERS | 0 |

$\oplus$ ... EXCLUSIVE OR

EXPLANETION OF FUNCTION OF CHANGING POINT DETECTION CIRCUIT 28

Fig. 5

| REGISTER INPUT NUMBER | REGISTER OUTPUT NUMBER | REMARKS |
|---|---|---|
| i<br>$(0 \leq i \leq n,$ )<br>INTEGER | $(A, i+Cont)$ | $A=(m+1)/2$ m:odd<br>$A=m/2$ m:even<br>*Cont: CONTROL SIGNAL FROM CONTROL CIRCUIT 38 |

EXPLANETION OF FUNCTION OF REGISTERS 44, 45 AND 48

BIT POSITION SYNCHRONIZER

CROSS REFERENCE TO RELATED APPLICATION

This application claims the priority of Japanese application Serial No. 149491/1999 filed May 28, 1999, the subject matter of which is incorporated herein by reference.

BACKGROUND OF THE INVENTION

1. Field of the Invention

The present invention relates to a bit phase synchronizer, and more particularly to a bit phase synchronizer for establishing and maintaining bit phase synchronization of a data signal being input in the form of a bit string.

2. Description of Related Art

Such a bit phase synchronizer is especially applied to a telecommunications system indicated in the ITU-T (International Telecommunication Union) council (ITU-T Recommendations) G.983.1 "BROADBAND OPTICAL ACCESS SYSTEMS BASED ON PASSIVE OPTICAL NETWORKS (PON)." The bit phase synchronizer indicated by this council includes a data signal input terminal and a reset pulse input terminal, where after the reset pulse arrives, a bit phase of the data signal in the form of a burst being input to a data signal input terminal is identified and synchronization is established. The bit phase synchronization is achieved by outputting a data signal with such a synchronized bit phase.

The Patent Gazette, Toku-Kai-Hei (laid open Patent No.) 9-162853 discloses a conventional burst bit phase synchronizer. The burst synchronizer disclosed in the Patent Gazette, first of all, over-samples a plurality of received burst data using a high-speed internal clock. Next, the phases of rising and falling edges of the received data are recognized by EXCLUSIVE OR of adjacent data. Further, bit synchronization around a central phase of an eye pattern of received data based on phase information of both edges thereof is established and fixed.

However, a conventional method such as this has a problem in which jitter ability for the received data deteriorates and bit synchronization cannot correspond to the phase change of the received data, when the deformation of the bit term for the received data is large.

SUMMARY OF THE INVENTION

It is a primary object of this invention to provide a bit phase synchronizer in which bit synchronization can follow a phase change of received data, even if the deformation of the bit term of the received data is large.

It is a further object to provide a clock generation circuit producing reduced deformation of a clock wave.

It is still another object of this invention to provide a differentiation circuit that is easily IC packaged, in which a differential input buffer to a rectifier circuit is packaged together.

These and other objects are accomplished by the following units. A bit position synchronizer for establishing bit position synchronization of input signals being input in a form of a bit string and outputting as an output signal, includes: a delay circuit for outputting a plurality of delay output signals by delaying the input signals by giving respective different time delays; a selector unit for selecting one of a plurality of outputs obtained from a plurality of delay circuits corresponding to an input selection signal and outputting as the output signal; a detection circuit for detecting a first changing point and a second changing point of the input signals after a reset pulse is input; a second register for storing information for the first changing point as the first changing point number; a third register for storing information for the second changing point as the second changing point number; and the first register for storing an intermediate value calculated based on a changing point number stored in the second register and the third register and outputting the intermediate value to the selector unit as the selection signal.

Further, in the bit position synchronizer of the present invention, a sampling unit samples input signals with a plurality of phases of clock signals, and the outputs thereof pass through a shift register unit having a plurality of stages with a master clock. A selector unit selects one of outputs from each register of the shift register unit, and generates a bit-synchronized output. A changing point detection unit compares outputs from the sampling unit, detects a signal change at adjacent phases, and gives a number indicating such a phase to the first control unit. The first control unit, after initialization by a reset pulse, stores an indication designating the first changing point in the second register unit, stores an indication designating the next changing point in the third register unit, calculates an intermediate value between them, and stores the intermediate value in the first register unit. The second control unit, after initialization, monitors change of outputs indicated by the second and third register units among outputs from a plurality of the shift register units and of outputs from a shift register in a predetermined range including such outputs. The second control unit increases/decreases a value of the second and third register units when the changing point is detected at a phase position succeeding or prior to the shift register indicated by the second and third register unit. The first register unit selects and controls the selector unit corresponding to the stored value.

Further, a bit position synchronizer of the present invention, includes: a sampling unit for sampling the input signals corresponding to a plurality of phases of clock signals, phases of which are different to each other, at a speed faster than a predetermined clock speed of the bit string, and outputting a plurality of corresponding outputs; a plurality of shift register units for passing a plurality of stages corresponding to a master clock at a speed faster than a clock speed of the bit string by receiving a plurality of outputs of the sampling units; a shift register unit for outputting respective outputs of such a plurality of shift registers; a selector unit for selecting one of outputs from a plurality of shift registers corresponding to a selection control signal and outputting as an output signal; a changing point detection unit for comparing a plurality of outputs from the sampling unit with each other and outputting the first indication designating a phase indicating such a signal change when a signal change is detected at adjacent phases among such a plurality of outputs; a selection control unit, including the first register unit for storing the second indication designating one of a plurality of shift registers, for generating a selection control signal corresponding to the value of the second indication stored in the first register unit; the second and third register units for storing the second indication; the first control unit for storing the first indication received from the changing point detection unit at first in the second register unit as the second indication after initialization by a reset pulse, subsequently storing the first indication received from the changing point detection unit in the third register as the second register, calculating an intermediate value between such two second indications, and storing such a value in the first register unit as the second indication; the second control unit for receiving an output from a plurality of shift registers after initialization by the reset pulse, monitoring change of outputs indicated by the second indication stored in the second and third register units among outputs from a plurality of the shift register units and outputs from a shift register in a first predetermined range including the outputs, and controlling the first, second, and third register units, in which the second control units, when a changing point is detected in outputs from a shift register, a phase position of which is prior to a shift register indicated in a second indication stored in the second and third register units, decreases a value of the second indication stored in the first, second, and third register units and, when a changing point is detected in outputs from a shift register, a phase position of which is subsequent to a shift register indicated in a second indication stored in the second and third register units, increases a value of the second indication stored in the first, second, and third register units. comparison unit for comparing outputs from a plurality of shift registers with a value of the second indication stored in the first register unit, monitoring change of outputs indicated by the second indication stored in the first register unit and of outputs from a shift register in the second predetermined range including the outputs, and controlling the first, second, and third register units. The comparison unit, when a changing point is detected in outputs from a shift register a phase position of which is prior to a shift register indicated in a second indication stored in the first register unit, decreases a value of the selection control signal and, when a changing point is detected in outputs from a shift register, a phase position of which is subsequent to a shift register indicated in a second indication stored in the first register unit, increases a value of the selection control signal.

The second control unit may be composed so as to respond to a slower clock than the master clock.

Further, in accordance with present invention, the structure can be formed in such a way that the first control unit, after initialization, when it is detected that the difference between values of consecutive first indications is lower than 1 bit term, stores the first indication designating a rising phase for the change of the detected signals in the second register unit as the second indication. In addition, the structure can also be formed in such a way that the first control unit also stores the first indication designating a falling phase in the third register as the second indication. Further, the structure can be formed in such a way that the second control unit compares and controls the change of the rising phase by the second indication stored in the second register unit and the change of the falling phase by the second indication stored in the third register unit.

BRIEF DESCRIPTION OF THE DRAWINGS

The objects and features of the invention may be understood with reference to the following detailed description of an illustrative embodiment of the invention, taken together with the accompanying drawings in which:

FIG. 4 is an explanatory view showing a logical rule of a changing point detection circuit in the preferred embodiment;

FIG. 5 is the same explanatory view as FIG. 4 showing a logical rule of a register in the preferred embodiment.

DETAILED DESCRIPTION OF THE INVENTION

Figure 1:
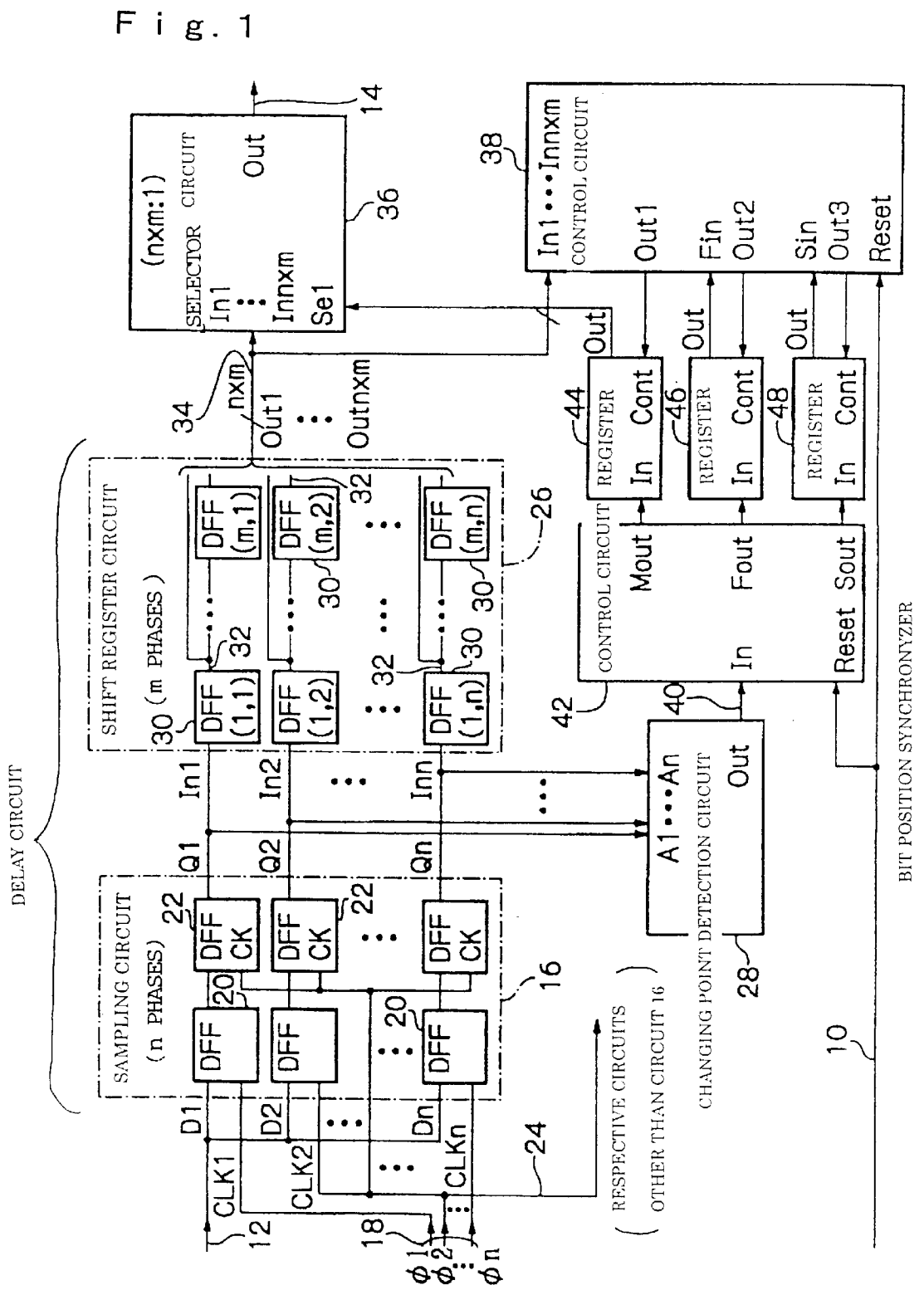
FIG. 1 is a functional block diagram showing the preferred embodiment of a bit phase synchronizer of the present invention.
Figure 2:
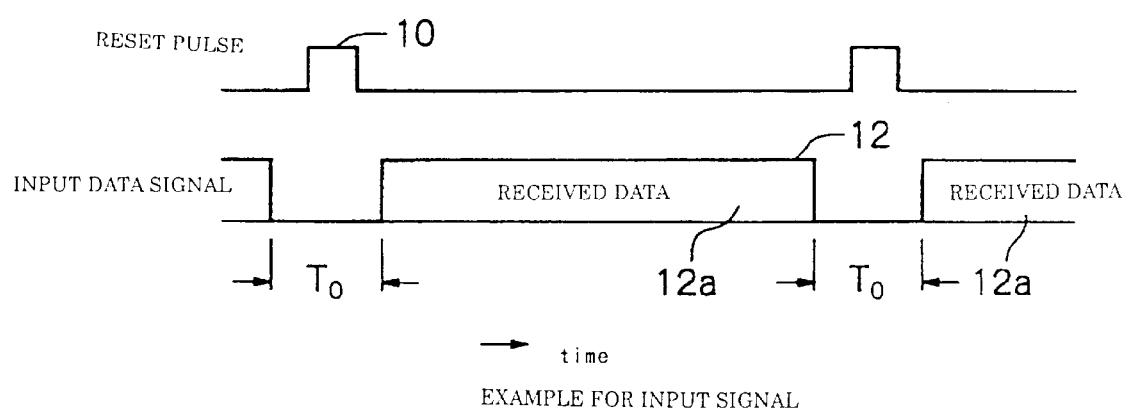
FIG. 2 is a wave-form showing examples of a reset pulse and an input data signal being input in the preferred embodiment of the bit phase synchronizer of the present invention.

In the following, a preferred embodiment of a bit position synchronizer of the present invention is explained in detail with reference to drawings. As shown in FIG. 1, a bit position synchronizer establishes synchronization by identifying a bit position of a data signal input to a data signal input terminal 12, after a reset pulse is applied to a reset pulse input terminal 10. As shown in FIG. 1, a reset pulse is input to the reset pulse input terminal 10, then a bit phase of a data signal being input to the data signal input terminal 12 is identified, and thus the bit position synchronizer establishes synchronization. A data signal is output from an output terminal 14 by such a synchronized bit phase, and this circuit then establishes and maintains the bit phase synchronization. In the preferred embodiment, a data signal being input to the data signal input terminal 12 contains, as shown in FIG. 2, a burst type bit string data 12a. Each bit string data 12a is divided by a silence interval $T_0$ generated in a predetermined period. Prior to arrival of each of the bit string data 12a, the reset pulse 10 is input in the silence interval $T_0$. The present invention is practically applied to a burst type input signal pattern in which such a reset pulse 10 is periodically input. However, the present invention is also applied to an application in which the input data signals are sequential data, for example. In such a case, when an application system of a bit position synchronizer is switched on, it is possible to compose in such away that the reset pulse 10 is input once. In the following explanation, the signal is indicated by a reference number of a connection line through which such a signal is conducted.

Figure 3:
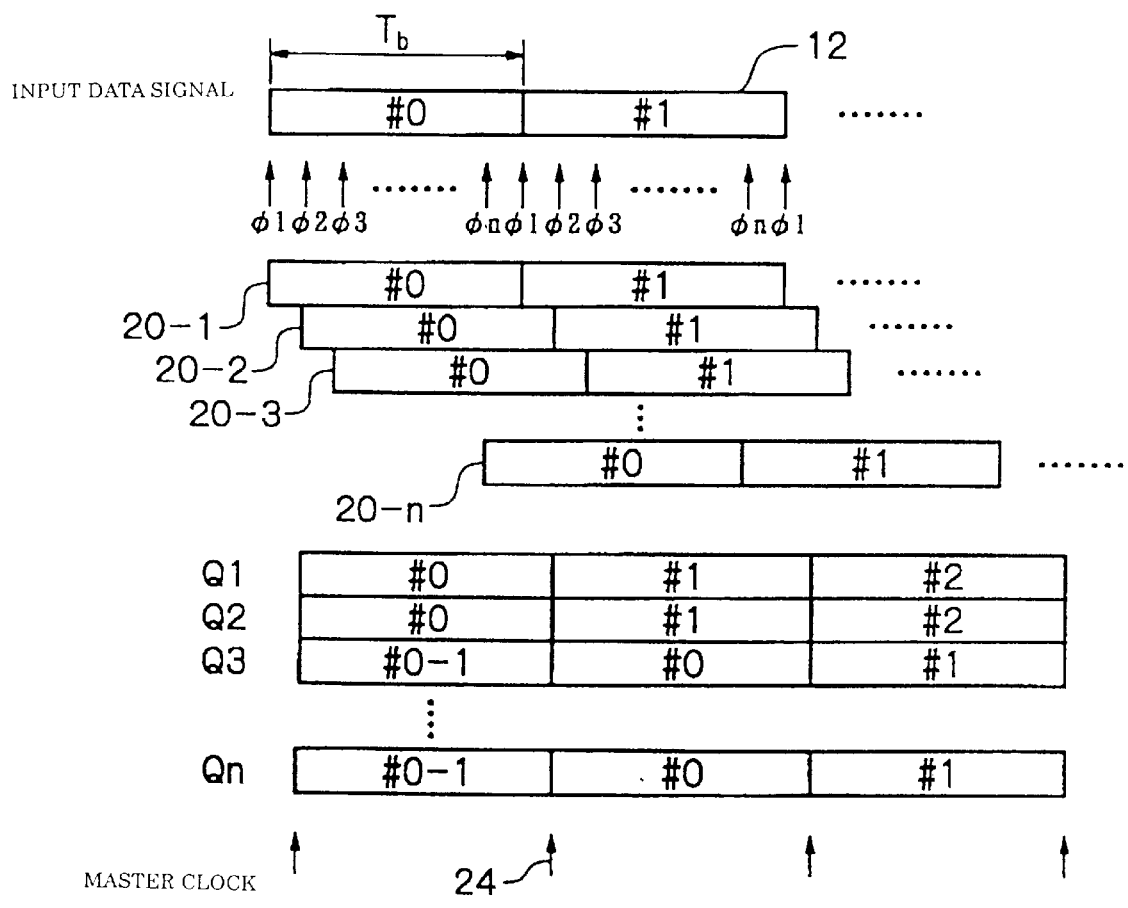
FIG. 3 is a time chart employed for explaining a multiphase sampling circuit in the preferred embodiment.

In FIG. 1, the data signal input terminal 12 is connected to n (n is an integer bigger than three) lines of input terminals D1 to Dn of a multiphase sampling circuit 16. The sampling circuit 16 includes a clock input (CLK1 to CLKn) terminal 18 to which n phases of multiphase clock signals φ1 to φn are input. Such multiphase clock signals φ1 φn include substantially the same frequency as the clock rate of the input data signal 12, but the relationship of the phase to the input data signal 12 is not determined. The phase of each of the multiphase clock signals φ1 to φn displaces each other, as shown in FIG. 3, and the difference of the phase is substantially equal to one n-th of 1 bit term Tb, that is to say, Tb/n. Although the phase number n of the multiphase clock signals φ1 to φn is possibly an integer bigger than 3, the greater the phase number is, the greater the resolution power of the bit phase synchronization is enhanced. The frequencies of the n phases multiphase clock signals φ1 to φn are not necessarily equal to the clock rate of the input data signal 12, as it can be much faster than this.

The sampling circuit 16 includes, as shown in FIG. 1, a set of n D-type flip flops DFFs) 20 and another set of n DFFS 22 in the same way, and both sets of DFFs 20 and 22 are connected in a two-stage way. The number of DFFs in each of two sets of DFFs 20 and 22 is equal to the phase number n of the n-phase clock signals φ1 to φn. One phase among the n-phase clock signals φ1 to φn corresponding to respective clock terminals CLK1 to CLKn of the pre-stage DFFs 20 is connected thereto.

In the preferred embodiment, one phase among the n-phase clock signals φ1 to φn, preferably, the phase of the middle range of the phase distribution, namely the second phase clock signal φ2 is used as a master clock of the phase synchronizer in this embodiment. The master clock φ2 is connected to each of clock input terminals CKs of the second stage DFFs 22. Further, it is also connected to a clock input terminal (not shown in the drawing) of respective functional units, described hereinafter, other than the sampling circuit 16, as shown inclusively using an arrow 24 in the same figure. Although such respective functional units function in synchronization with this master clock 24, such clock terminals and clock connection lines are not shown in the drawings in order to simplify the figures. Although the master clock 24 relates to the n-phase clock signals φ1 to φn in the preferred embodiment, it can be an independent clock from them. The frequency of the master clock 24 is substantially equal to the clock rate of the input data signal 12 in the preferred embodiment, but it can also be much faster than this.

The sampling circuit 16 is a multi-phase sampling functional unit in which the input data signal 12 is sampled as the n phase data by the n-phase clock signals φ1 to φn. The input data signal sampled as this n phase is synchronized to the master clock 24, and outputs are obtained from n outputs Q1 to Qn respectively.

More particularly, as shown in FIG. 3, sampling of a data signal such as #0 of a one bit interval Tb contained in the input data signal 12 is performed by the n-phase clock signals φ1 to φn by the pre-stage DFF 20. Respective holding conditions of the data of such DFFs 20 are indicated by respective reference numbers 20-1 to 20-n. A bit signal #1 successive to the bit signal #0 is also kept in DEF 20 in the same way. In this stage, the data of the bit signal #0 kept in DFF 20 synchronized with the master clock 24, is transferred to DFF 22, and kept therein. Such conditions are indicated by Q1 to Qn in the same figure. As shown in this figure, since the master clock φ2 as the second phase is processed as the master clock in this example, a DFF until the second phase among DFFs 22 keeps new bit data, and DFFs corresponding to other phases keep data with the preceding phase. N outputs Q1 to Qn of the sampling circuit 16 are connected to n inputs In1 to Inn of a shift register circuit 26, while they are connected to n inputs A1 to An of a changing point detection circuit 28.

The shift register circuit 26 composes a delay circuit for outputting a plurality of delay signals by giving respective different delay times to the input signals. In the preferred embodiment, a set of n DFFs 30, that is to say, the shift register, is a register circuit having n sets and sequentially connected m (m is an integer bigger than three) stages. Although the number m of stages for a set of n DFFs 30 can be an integer bigger than 3, the greater the number of the stages is the higher the resolution power of the bit phase synchronization is. The number n of the DFFs 30 included in respective stages is the same as the phase number of the n-phase clock signals φ1 to φn, and each of DFFs 30 is provided corresponding to each phase of the n-phase clock signals φ1 to φn. Respective inputs In1 to Inn of the n DFFs 30 of the first stage are connected corresponding to outputs Q1 to Qn of the sampling circuit 16. N outputs among outputs 34 of the shift register circuit 26 are formed while outputs 32 of DFFs 30 are connected to inputs of DFFs 30 of the next stage. By applying this repetitive connection to m stages, n sets and m stages as a whole, that is to say, respective outputs 32 of DFFs 30 of n ×m sets are connected to the inputs of the DFFs 30 of the next stages, and thus the outputs 34 of the shift register circuit 26 are formed as the n ×m outputs Out1 to Outn×m.

In the preferred embodiment, the numbers are given to specify each of such n ×m DFFs 30, and such numbers are represented by a set of numerical values (m, n) of the most significant number (MSB) indicating the number n of stages and the least significant number (LSB) indicating a phase n. In accordance with such components, the shift register circuit 26 delays n signals that are input to inputs In1 to Inn respectively, by the shift registers 30 having m stages, and such delayed signals Out1 to Outn×m are output to a selector circuit 36 and a control circuit 38 from the outputs 34.

The present bit phase synchronizer includes a phase selection function for outputting a bit signal, which is selected by the selector circuit 36 in order to decide the most suitable signal among n phase bit signals, m stages of which are delayed by the shift register circuit 26, namely, m sets of which are kept, so as to establish synchronization, to the output terminal 14. Each of functional units explained in the following is for deciding which phase is the most suitable signal.

The changing point detection circuit 28 compares logical values of signals, the phases of which are next to each other, and detects a rising change and a falling change of the data signal input terminal 12, for n signals that are input to n inputs A1 to An. When such a signal change is detected, an output signal indicating a phase number, given in advance for the difference between detected phases, is output from the output 40. Logic for detecting such a phase change is in accordance with logic shown in FIG. 4 in the preferred embodiment.

In the logic table shown in FIG. 4, a symbol of (+) enclosed by a circular mark indicates EXCLUSIVE-OR. Accordingly, if consecutive inputs $A_k$ and $A_{k+1}$ among the inputs A1 to An of the changing point detection circuit 28 are not the same, namely EXCLUSIVE-OR IS 1, a number K is output to the output 40. Here, k is an integer ($1 \leq k \leq n-1$). However, when both ends, namely, inputs A1 and An, of a phase distribution of the data signal input terminal 12 are compared, if not the same, the changing point detection circuit 28 outputs a number n to the output 40.

Otherwise, a number 0 is output. The output 40 of the changing point detection circuit 28 is connected to the input terminal In of a control circuit 42. Although the phases 1 to n are indicated by numerical values in the preferred embodiment, the present invention is not limited to such numerical values but may use expressions including symbols, etc. other than numerical values.

The control circuit 42 includes a reset terminal Reset connected to the reset pulse input terminal 10. The circuit changes to a waiting condition due to the reset pulse signal 10, since the value Out of a changing point detection phase circuit number $A_i$ (i is the integer of 0 to n, namely $0 \leq i \leq n$) that is initially output from the changing point detection circuit 28 is then output from one output terminal Fout. Next, the control circuit 42 includes an initial phase establishment control function by which an intermediate value between this first input value and the second input value is calculated and output from another output terminal Mout, while the control circuit 42 outputs the value Out of a changing point detection phase number to be output from another output terminal Sout. The control circuit 42 does not receive the value Out of the changing point detection phase number that is input from the changing point detection circuit 28, until the reset pulse signal 10 is input again and the wait condition is established. The output terminal Mout of the control circuit 42 is connected to an input terminal In of a register 44, the output terminal Fout is connected to an input terminal In of the other register 46, and further the output terminal Sout is connected to an input terminal In of another register 48.

These three registers 44, 46, and 48 can be substantially the same circuits, and they are memory circuits for storing each changing point number, namely, an indication that is input to the input terminal In from the control circuit 42. The register 44 includes a control signal input terminal Cont connected to a control signal output terminal Out1 of the control circuit 38. The register 44 also includes an output terminal Out connected to a selection control signal input terminal Sel of the selector circuit 36, and comprise, a selection control circuit for supplying the selection control signal input terminal Sel for controlling a selection function of the selector circuit 36. The register 46 includes an output terminal Out connected to an input terminal Fin of the control circuit 38, and also includes a control signal input terminal Cont connected to another control signal output terminal Out2 of the control circuit 38. In the same way, the register 48 includes an output terminal Out connected to an input terminal Sin of the control circuit 38, and further includes a control signal input terminal Cont connected to another control signal output terminal Out3 of the control circuit 38.

Due to such components, the changing point number, namely, the indication stored in the registers 44, 46, and 48 from the control circuit 42 is input to the selector circuit 36 and the control circuit 38 discussed later, and used for signal selection and number comparison. In order to achieve this function, the registers 44, 46, and 48 calculate, in accordance with a logic exemplified in FIG. 5, a set of numerical values (m, n) indicating DFFs 30 of the shift register circuit 26, and then output these from respective outputs Out. It is not necessarily required that such a set of numerical values (m, n) be represented by numbers, and further it is possible to use another indications such as a reference number to specify the DFF 30.

Here, the register 44 is chosen as an example for explanation. When an input number i is input to the input terminal In (i is the integer from 0 to n, namely, $(1 \leq i \leq n-1)$) from the output terminal Mout of the control circuit of one side, namely, the initial phase establishing control circuit 42, the register 44 generates a nearly middle stage, namely the value of the vicinity of m/2, among the DFFs 30 of each stage as a most significant number A of a set of numerical values indicating DFFs 30. The value of an input Cout from the control circuit 38 of the other side, discussed later, is added to a value i corresponding to the phase of an input number, namely the input data signal 12, as the least significant number. A set of values (A, i +Cout) as the result thereof is then output from an output Out. As discussed later, the input data Cont from the control circuit 38 is a positive or negative value.

The value of the vicinity of m/2 is based on the number m of the stages of the shift register stages formed in the DFFs 30, which is precisely defined as A=m/2 for an even number system or A=(m +1)/2 for an odd number system. Thus, the value of the input number i is generated as the least significant number, since the value of input Cont from the control circuit 38 as one side is 0 in the initial condition in which the control circuits 42 and 38 are reset in the reset pulse 10, as discussed later. That is to say, the number (A, i+Cout) of DFFs 30 being output to the output Out from the register 44 is expanded to a number corresponding to an arbitrary one of outputs Out1 to Outn×m of each DFF 30 of the shift register circuit 26. This is achieved by increasing or decreasing the phase number i being input from the control circuit 42 of one side, in accordance with the control signal Cont from the control circuit 38 of the other side.

As previously explained, the output terminals Out1 to Outn×m of the shift register circuit 26 are connected to input terminals In1 to Inn×m of the selector circuit 36 respectively, or, they are connected to the input terminals In1 to Inn×m of the control circuit 38. The selector circuit 36 includes the selection control signal input terminal Sel connected to the output Out of the register 44, and is a signal selection function for n×m: 1 for outputting by selecting from the outputs Out1 to Outn×m of the shift register circuit 26, in accordance with the phase number (A, i+Cout) given by the register 44. This output 14 comprises a unit output from the present bit phase synchronizer.

The control circuit 38 includes three output terminals Out1, Out2, and Out3, and each of them is connected to each of input terminals Cont of the registers 44, 46, and 48. The control circuit 38 is a so-called phase change follow-up control circuit including a changing point detection modification function, for modifying and outputting the value of inputs Fin and Sin indicating a phase number (A, i+Cout) corresponding to two phase numbers Fout and Sout succeeding the reset stored in two registers 46 and 48, to the registers 44, 46, and 48 from respective output terminals Out1, Out2, and Out3, in accordance with a unique logical rule of the control circuit 38.

More particularly, the control circuit 38 is initialized by an input of the reset pulse signal 10 at first, and thus the outputs Out1 to Out3 change to 0. The control circuit 38 detects a signal change point between phases next to each other within the range of outputs from the shift register circuit 26 included in a predetermined range j around the changing point phase number, indicated by the output Fin from the register 46. The predetermined range j is the integer ($1<j \leq n/2-1$) within the range of 1 to numbers where 1 is subtracted from ½ of the phase number n of the multi-clock 18, and set in a fixed or variable way. In the preferred embodiment, the predetermined range j is developed in a balanced range around the changing point phase number indicated by the output Fin of the register 46, but it may deviate by slightly more or less than the balanced state. The phase number is given by the logical rule of this detected change point, and then difference calculus is performed based on the changing point phase number indicated by the output Fin of the register 46. This logical rule is the same rule as the logical rule (FIG. 4) in the changing point detection circuit 28 in the preferred embodiment.

In the same way, the output Sin of the register 48 detects a signal change point between the phases next to each other, within the output range of the shift register circuit 26 included in the numbers j around the changing point phase number, corresponding to the second phase number Sout right after the reset is performed. Difference calculus is performed based on the (hanging point phase number indicated by the output of the register 48, by giving the phase number to this changing point. The control circuit 38 outputs "+1" as the outputs Out1 to Out3 if both calculated difference values are positive, and outputs "−1" if they are negative, otherwise the condition for the preceding values is maintained.

Thus, the control circuit 38 repeats a comparison between the output Fin of the register 46 and the output Sin of the register 48 alternatively and persistently, and modifies and controls the phase numbers stored in the registers 44, 46, and 48. The preferred embodiment is composed in such a way that the outputs Out1 to Out3 of the control circuit 38 can be arbitrary values of three types, "+1," "0," and "−1." The present invention, however, is not limited to such specific values, but is capable of applying arbitrary values if the value of the selection control signal Sel is within the range not exceeding the number n×m of the DEFs 30 included in the shift register circuit 26.

In an operating condition, when the reset pulse signal 10 is input, the control circuit 42 and the control circuit 38 are initialized, and the waiting condition changes to prepare for the arrival of the input data signal 12. In this condition, the control circuit 38 initializes the outputs Out1 to Out3 to be 0.

Thus, when the input data signal 12 arrives, this is input to the sampling circuit 16, and then sampled in the n phase way by the n-phase clock signals $\phi 1$ to $\phi n$. The sampling circuit 16 outputs the input data signal sampled in the n phase way from the outputs Q1 to Qn by synchronizing with the master clock $\phi 2$. The n data signals being output are input to the changing point detection circuit 28.

The changing point detection circuit 28 detects a rising change and a falling change of the input data signal 12, based on comparison of the logical values of the phases next to each other of input signals A1 to An. When such signal changes are detected, the changing point detection circuit 28 outputs to the control circuit 42 the phase number 40 given in advance for the detection phases, in accordance with logic shown in FIG. 4.

The control circuit 42 that has been in a wait condition due to the reset pulse signal 10 first outputs the value Ai of the changing point detection phase number being input, after resetting. In the same way, the value of the phase number in which the change point is detected is input next. This is output from the terminal Sout. However, the changing point detection phase number being input after that is not accepted until the reset pulse 10 is input again and the wait condition changes to ready. Further, the control circuit 42 calculates the value Fout of the changing point detection phase number that has been initially input and the value Sout of the changing point detection phase number that has been input secondly, and outputs the result value from the terminal Mout. In this way, the control circuit 42 establishes an initial phase. The registers 44, 46, and 48 store and memorize each changing point number being output from the control circuit 42.

On the other hand, n outputs Q1 to Qn of the sampling circuit 16 are also input to the m stages of a shift register circuit 26. The shift register composed of m stages of DFFs 30 of the shift register circuit 26 delays each of n signals In1 to Inn being input for m stages, and outputs n×m outputs of each shift register thereof to the next stage of selector circuit 36 and the control circuit 38.

Here, the changing point number stored in the register 44 is input to the selection control signal input terminal Sel of the selector circuit 36 from the output Out thereof, and used for a signal selection. Further, the changing point number stored in the registers 46 and 48 are input to the control circuit 38 and used for number comparison. In the registers 44, 46, and 48, the most significant number of the output numbers indicates surroundings of m/2 in the initial condition after the reset pulse signal 10 is input, and the least significant number indicates the number that is input to respective registers 44, 46, and 48. Namely, the stored phase number fluctuates in accordance with the control signal Cont from the control circuit 38.

Thus, the control circuit 38 detects the signal change point between phases next to each other within the range of the outputs from the shift register circuit 26, corresponding to the surroundings j of the changing point detection phase number indicated by the output Out from the register 46. The phase number is given to such a detected change point, and then difference calculus is applied based on the changing point detection phase number indicated by the output from the register 46. In the same way, detection of the signal change point is undertaken between phases next to each other within the range of the outputs from the shift register circuit 26, corresponding to the surroundings j of the changing point detection phase number indicated by the output Out from the register 48. The phase number is given to such a detected change point, and then difference calculus is applied based on the changing point detection phase number indicated by the output from the register 48. In accordance with a sign condition of the difference calculus between both registers, the control circuit 38 outputs "+1" or "−1" from the outputs Out1 to Out3. Otherwise, the outputs Out1 to Out3 maintain the preceding condition.

Thus, the control circuit 38 repeats persistently and alternatively the comparison between the outputs of the register 46 and the register 48, and thus the phase number stored in the registers 44, 46, and 48 is controlled. The phase number stored in the register 44 is input to the selector circuit 36 from the output Out thereof. The selector circuit 36 selects a signal from the inputs Out1 to Outn×m corresponding to the input Sel, and the sign of the result is output from the unit output 14.

After the initial phase has been established, if the phase of the input data signal 12 leads the phase difference of the multi-clock, for example, 1/n phase to the master clock $\phi 2$ in the persistent condition, the control circuit 38 outputs the value "−1" from the outputs Out1 to Out3 in accordance with the above-mentioned operation. Thus, the phase number output to the output Out by the register 44 decreases, and the selector circuit 36 then changes the input signals Out1 to Outn×m being selective targets in the direction of the phase change of the input data signal 12, namely the proceeding direction. Further, the phase of the input data signal 12 is delayed 1/n phase to the master clock $\phi 2$, and the control circuit 38 outputs the value "+1" from the outputs Out1 to Out3 by the same operation. Thus, the phase number of the register 44 increases, then the selected signal of the selector circuit 36 switches to the direction of the phase change of the input data signal 12, namely, to the delay direction. By repeating such a phase follow-up control persistently, the present bit phase synchronizer can follow up the phase change of the input data signal 12.

The present invention includes a function for monitoring persistently the changing point of the input data signal 12 by the control circuit 38, and fluctuating the value of the registers 44, 46, and 48 corresponding to the signal changes. In accordance with this function, it is possible not to deteriorate jitter ability, even if the size of distortion of the bit term of the input data signal 12 is large. Further, the range to be monitored is limited to the predetermined range, namely to the above-mentioned range ±j, since a storing circuit for storing the signal change monitoring number or indication is composed of three independent registers 44, 46, and 48. Thus, the circuit composition becomes simple and electric power consumption can be reduced.

In the preferred embodiment, the changing point detection circuit 28 and the control circuits 42 and 38 can be composed in the following way. Modified examples are explained hereinafter. The changing point detection circuit 28 of such modified examples includes a persistent monitoring function for outputting the phase number 40 indicating the phase, to the control circuit 42 if the rising or falling change of the input data signal 12 is detected, by detecting persistently the changing point of the data signal input terminal 12 after the wait condition changes to being ready due to the reset pulse signal 10.

In this modified example, the control circuit 42 includes a function for monitoring the phase number 40 from the changing point detection circuit 28 by receiving the changing phase point to be input, and for determining whether or not the difference between the phase of the falling point and tile subsequent phase of the rising point is lower than the predetermined value, namely 1 bit term Tb of the input data signal 12 in this embodiment. More particularly, the control circuit 42 continues to receive the input changing point phase until the difference between the phase of the falling point and the subsequent phase of the rising point is lower than 1 bit term Tb of the input data signal 12. The middle phase number of both of them is calculated and input to the registers 44 while the phase numbers of the rising and falling changing points are input to the registers 46 and 48 respectively, when it is determined that the difference between the phases of such successive changing points is lower than 1 bit term Tb. At this stage, the timing order for the rising change and the falling change is not considered, but the phase numbers of the rising and falling changing points may be stored in the registers 46 and 48. The control circuit 42 pauses to receive the changing point phase, after this judgement timing.

The control circuit 38 includes a function for comparing the changing point phase numbers, namely indications, stored in the registers 46 and 48 with the outputs Out1 to Outn×m from the corresponding shift register circuit 26, in the same way as the foregoing description. A comparison algorithm for the phase numbers stored in the registers 46 and 48 is performed for the corresponding phase monitoring range, namely the rising and falling changes, for example, of the outputs from the shift register circuit 26 in the above-mentioned range ±j. The judgement standard for fluctuation control of the phase number stored in the registers 44, 46, and 48 can be exactly the same as the foregoing description.

In an operating condition, the control circuits 42 and 38 change to a ready condition by inputting the reset pulse signal 10. The control circuit 42 continues to receive the input changing point's phase until the difference between the phases of the continuous rising and falling changing points changes to lower than 1 bit term Tb. When the difference between such continuous changing point's phases changes to lower than 1 bit term Tb, the phase numbers of the rising and falling changing points are output to the registers 46 and 48 respectively. In addition, the middle phase number between both of them is output to the register 44. In this way, the control circuit 42 receives and monitors the input changing point, and determines whether or not the difference between the phases of the continuous rising and falling changing points is lower than 1 bit term Tb. The control circuit 42 then pauses to receive inputs of the changing point phase. The control circuit 38 compares the changing point phase number stored in the registers 46 and 48 with the outputs Out1 to Outn×m from the corresponding shift register circuit 26. For example, the phase number stored in the register 46 is compared at the point of the rising change of the output from the shift register circuit 26 in the corresponding phase monitoring range ±j in the control circuit 38.

In the same way, the phase number stored in the register 48 is compared at the point of the falling change of the output from the shift register circuit 26 in the corresponding phase monitoring range ±j. Thus, the phase numbers stored in the registers 44, 46, and 48 are fluctuated and controlled.

In a modified example including the control circuits 42 and 38 and changing point detection circuit 28 composed in this way, the control circuit 42 includes a function for detecting whether or not the continuous changing point phase of the input data signal 12 is lower than 1 bit term Tb of the input data signal 12. Thus, it is possible to stably establish an initial phase of a pulse having a narrow bit term Tb of the bit pulses included in the input data signal 12. Further, the embodiment is composed in such a way that the phase numbers of the rising and falling changing points are stored separately in the registers 46 and 48, and the phase numbers of the rising and falling changing points are detected separately. Thus it is expected that the circuit composition becomes simple and the electric power consumption becomes less.

Figure 6:
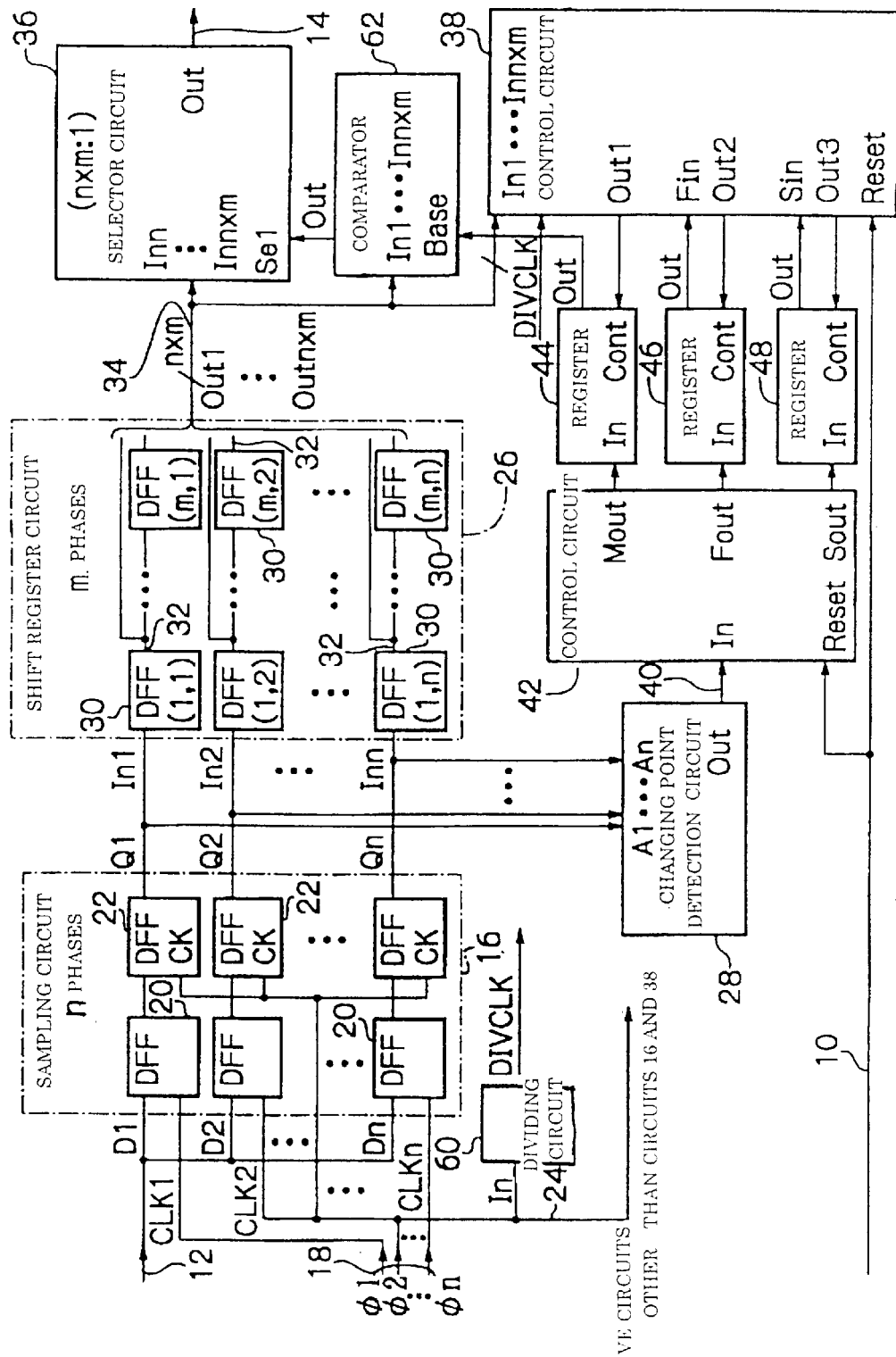
FIG. 6 is the functional block diagram as FIG. 1 showing another example of the bit phase synchronizer of the present invention.

With reference to FIG. 6, the preferred embodiment of the present invention further includes a dividing circuit 60, having the same components as the preferred embodiment previously explained with reference to FIG. 1, other than the control circuit 38 which operates by a clock DIVCLK obtained by demultiplexing the frequency of the master clock 24, a comparator circuit 62 which is included, and a signal obtained by modifying the phase number output from the register 44 as a selective control signal Sel of the selector circuit 36 by a logical rule which is given. In FIG. 6, the same elements as the elements indicated in FIG. 1 are indicated using the same reference numbers, and thus a duplicated explanation is omitted.

The master clock 24, namely the second phase master clock ◊2 in the preferred embodiment, is connected to the clock input terminal of each circuit other than the sampling circuit 16 and the control circuit 38. The dividing circuit 60 is a frequency demultiplexer including an input terminal In connected to such a master clock 24, dividing the master clock ◊2 into 1/k (k is a natural number), and outputting the clock DIVCLK obtained by demultiplexing such a frequency form as the output terminal DIVCLK. The output terminal DIVCLK is connected to the clock input terminal DIVCLK of the control circuit 38.

The output terminal Out of the register 44 is connected to the input terminal Base of the comparator circuit 62, and such an output terminal Out is also connected to the terminal Sel of the selector circuit 36. The comparator 62 also includes the input terminals In1 to Inn×m connected to the n×m outputs Out1 to Outn×m of the shift register circuit 26 respectively. The comparator 62 is a comparison circuit for modifying the phase number Base that is output from the register 44 by a logical rule, based on the input terminals In1 to Inn×m, and outputting as the selective control signal Sel of the selector circuit 36.

More particularly, the comparator circuit 62 monitors the changing points of the output phases In1 to Inn×m of the corresponding shift register circuit 26 for the phase number Base indicated by the register 44, for example, in the same phase range as the predetermined range ±j detecting the signal changing point between adjacent phases around the phase number of the changing point indicated by the output Fin from the register 46 set provided in the above-mentioned control circuit 38. When the changing point is in the range ±j in which the changing point is designated, the comparator 62 performs difference calculus based on the phase number indicated by the register 44, and immediately switches the selector circuit 36. The comparator 62 composes a selective control circuit together with the register 44, for supplying a selective control signal Sel for controlling selective operation of the selector circuit 36, to the selector circuit 36. Although the phase range for detecting adjacent phase changing points around the phase number of the changing point indicated by the output Fin from such a register 46 is the same range as the predetermined range j provided in the control circuit 38, the present invention is not necessarily limited to this range, but can be applied to another range.

In an operating condition, the control circuit 38 operates the divided clock DIVCLK, as an operating clock, obtained by dividing the master clock φ2 into k by the dividing circuit 60. Therefore, the control circuit 38 functions with a low speed clock, and thus the period for modifying the phase number stored in the registers 44, 46, and 48 can be processed at a slow speed.

The comparator circuit 62 monitors the changing point of the output phase from the corresponding shift register circuit 26 in the above-mentioned phase range ±j, for the phase number Base indicated by the register 44. The comparator circuit 62 performs difference calculus based on the phase number indicated by the register 44 when the comparator circuit 62 detects that the changing point is in the designated range ±j. More particularly, the comparator circuit 62 compares the outputs Out1 to Outn×m from respective shift registers 30 with the value Base stored in the register 44, and monitors changing of each output indicated by this value Base among the outputs Out1 to Outn×m from the respective shift registers 30, and each output from the shift registers 30 in the predetermined range ±j containing this output. When the changing point of the outputs from the shift register, the phase position of which is prior to that of the shift registers 30 indicated by the value Base, is detected, the comparator 62 decreases the value of the selective control signal Sel. The comparator circuit 62 increases the value of the selective control signal Sel when the changing point, the phase position of which is behind, is detected. Thus, the selector circuit 36 can immediately perform switching. In this way, the selector circuit 36 is switched in a high-speed manner since the control circuit 38 functions with the dividing clock DIVCLK, and the comparator circuit 62 is provided.

In the preferred embodiment shown in FIG. 6, high-speed signal selection is performed by the comparator circuit 62 for the fast phase change of the input data signal 12, and signal selection is performed at the selector circuit 36 by moderately modifying the phase number of the registers 44, 46, and 48 by the control circuit 38 for the moderate phase change of the input data signal 12.

In this preferred embodiment, the same effect as the preferred embodiment shown in FIG. 1 occurs. Further, since the comparator circuit 62 for high-speed switching of the selector circuit 36 is provided separately, the control circuit 38 is composed of circuit elements functioning at a low speed, which is expected to reduce further the power consumption of the circuit. In addition, the same modified examples of the changing point detection circuit 28 and the control circuits 42 and 38 as explained in the preferred embodiment shown in FIG. 1 can be applied effectively to the preferred embodiment shown in FIG. 6.

In this way, the preferred embodiment of the present invention embodies elements by which the changing point of the input data signal is monitored persistently and fluctuation of the value indicating the phase stored in a stored circuit for storing the indication of the position at which the signal change is detected. Thus, it is possible to avoid deterioration of the jitter ability, even if the size of distortion of the bit term of the input data signal is large.

Further, it becomes possible to simplify circuit composition and reduce electric consumption since the range to be observed is within a predetermined range in the case where the storing circuit for the phase indicator for the signal change is composed of three independent registers.

While particular embodiments of the present invention have been described and illustrated, it should be understood that the invention is not limited thereto, since modifications may be made by persons skilled in the art. The present application contemplates any and all modifications that fall within the spirit and scope of the underlying invention described and claimed herein.

What is claimed is:

1. A bit position synchronizer, comprising:
    a sampling circuit which samples an input signal based on a plurality of phases of clock signals to obtain a plurality of sampled signals;
    a selector which selects one of the plurality of sampled signals, each of which is delayed for a short period, based on a selection signal and which outputs an output signal;
    a detection circuit which detects a first changing point and a second changing point of the sampled signals;
    a first register which stores a first value for the first changing point;
    a second register which stores a second value for the second changing point; and
    a third register which stores an intermediate value between the first and second values and which outputs the selection signal.

2. A bit position synchronizer according to claim 1, further comprising a delay circuit including:
    the sampling circuit, the phases of clock signals being different to each other at a speed faster than a predetermined clock speed of a bit string of the input signal; and
    a register means, including a plurality of shift registers, for passing a plurality of stages corresponding to a master clock at a speed faster than the clock speed of the bit string, by receiving the plurality of sampled signals, for outputting respective outputs of the plurality of said shift registers.

3. A bit position synchronizer according to claim 1, further includes:
    a control means for controlling information of changing points stored in said second register and said third register, wherein said control means, if a detected changing point is prior to a phase position of changing points of phases indicated by the changing point stored respectively in said second register and said third register after initialization is performed by a reset pulse, decreases the intermediate value stored in said first register, said second register, and said third register and a value of the first changing point and the second changing point, and, if a detected changing point is subsequent to a phase position of changing points of phases indicated by the changing point stored respectively in said second register and said third register, increases the intermediate value stored in said first register, said second register, and said third register and a value of the first changing point and the second changing point.

4. A bit position synchronizer in which input data signals of a burst type bit data after a reset pulse are received and output signals synchronizing with a bit phase of the input data signal are output after the reset pulse arrives, comprising:

- a sampling means for sampling the input data signals corresponding to a clock signal of a plurality of phases which are different to each other at a speed faster than a clock speed of the bit data and outputting a plurality of corresponding outputs;
- a shift register means, including a plurality of shift registers for passing a plurality of stages corresponding to a master clock at a speed faster than a clock speed of the bit data by receiving a plurality of outputs of said sampling means, for outputting respective outputs of a plurality of said shift register;
- a selector means for selecting one of a plurality of outputs obtained from a plurality of shift registers corresponding to a selection control signal and outputting as the output signal;
- a changing point detection means for comparing a plurality of outputs from said sampling means with each other, and outputting a first indication designating a phase detected by a signal change if the signal change is detected at adjacent phases among a plurality of outputs;
- a selection control means, including a first register means for storing a second indication designating one of a plurality of shift registers, for generating the selection control signal corresponding to a value of the second indication stored in the first register means;
- a second and third register means for storing the second indication respectively;
- a first control means for storing a first indication initialized by the reset pulse and received from said changing point detection means first after initialization, storing the first indication received from said changing point detection means in said third register means as the second indication, calculating an intermediate value of two second indications, and storing the intermediate value as a second indication in a first register means; and
- a second control means for receiving an output from a plurality of shift registers after initialization by the reset pulse, monitoring change of outputs indicated by the second indication stored in said second and third register means among outputs from a plurality of said shift register means and outputs from a shift register in a first predetermined range including the outputs, and controlling said first, second, and third register means,
- wherein, said second control means, when a changing point is detected in outputs from a shift register a phase position of which is prior to a shift register indicated in a second indication stored in said second and third register means, decreases a value of the second indication stored in said first, second, and third register means and, when a changing point is detected in outputs from a shift register a phase position of which is subsequent to a shift register indicated in a second indication stored in said second and third register means, increases a value of the second indication stored in said first, second, and third register means.

5. A bit position synchronizer according to claim 4, wherein said selection control means includes:

- a comparison means for comparing outputs from a plurality of said shift registers with a value of a second indication stored in said first register means, monitoring change of outputs indicated by a second indication stored in said first register means and outputs from a shift register in a second predetermined range including the outputs, and controlling said first, second, and third register means, and
- said comparison means, when a changing point is detected in outputs from a shift register a phase position of which is prior to a shift register indicated in a second indication stored in said first register means, decreases a value of the selection control signal and, when a changing point is detected in outputs from a shift register a phase position of which is subsequent to a shift register indicated in a second indication stored in said first register means, increases a value of the selection control signal.

6. A bit position synchronizer according to claim 5, wherein said second control means functions at a speed corresponding to a clock slower than said master clock.

7. A bit position synchronizer according to claim 6, includes:

- a dividing means for dividing arbitrarily one of clock signals of a plurality of phases, generating the slower clock, and providing said slower clock to said control means.

8. A bit position synchronizer according to claim 4, wherein the master clock is arbitrarily one of a plurality of said clocks.

9. A bit position synchronizer according to claim 5, wherein the second predetermined range is substantially equal to the first predetermined range.

10. A bit position synchronizer for receiving an input data signal as bit data in a form of burst data after a reset pulse is input, and for outputting an output signal synchronized with a bit phase of the input data signal, comprising:

- a sampling means for outputting a plurality of corresponding outputs by sampling the input data signal by responding to a plurality of clock signal phases which are different to each other, at a speed faster than a clock speed of the bit data;
- a shift register means, including a plurality of shift registers passing outputs received by responding to a master clock at a speed faster than a clock speed of the bit data, after receiving a plurality of outputs of said sampling means, for outputting respective outputs of a plurality of shift registers;
- a selector means for selecting one of a plurality of outputs obtained from a plurality of shift registers corresponding to a selection control signal and outputting as the output signal;
- a changing point detection means for comparing a plurality of outputs of said sampling means with each other and, when a signal change is detected at adjacent phases among a plurality of the outputs, outputting a first indication designating a phase detecting the signal change;
- a selection control means, including a first register means for storing a second indication designating one of a plurality of shift registers, for generating the selection control signal corresponding to a value of the second indication stored in the first register means;
- a second and third register means for storing the second indication respectively;
- a first control means for storing a first indication designating a rising phase for a detected signal change in said second register means as a second indication if it is detected that a difference between values of consecutive first indications is lower than 1 bit term after being initialized by the reset pulse, storing the first indication designating a falling phase for the detected signal changes in said third register means as the second indication, calculating an intermediate value of two second indications, and storing the intermediate value as a second indication in a first register means;

a second control means for receiving an output from a plurality of shift registers after initialization by the reset pulse, monitoring change of outputs indicated by the second indication stored in said second and third register means among outputs from a plurality of said shift register means and outputs from a shift register in a first predetermined range including the outputs, and controlling said first, second, and third register means;

wherein, for the rising phase change, said second control means, when a changing point is detected in outputs from a shift register a phase position of which is prior to a shift register indicated in a second indication stored in said second register means, decreases a value of the second indication stored in said first, second, and third register means and, when a changing point is detected in outputs from a shift register a phase position of which is subsequent to a shift register indicated in a second indication stored in said second register means, increases a value of the second indication stored in said first, second, and third register means, and for the falling phase change, said second control means, when a changing point is detected in outputs from a shift register a phase position of which is prior to a shift register indicated in a second indication stored in said third register means, decreases a value of the second indication stored in said first, second, and third register means and, when a changing point is detected in outputs from a shift register a phase position of which is subsequent to a shift register indicated in a second indication stored in said third register means, increases a value of the second indication stored in said first, second, and third register means.

11. A bit position synchronizer according to claim 10, wherein said selection control means includes:

a comparison means for comparing outputs from a plurality of said shift registers with a value of the second indication stored in the first register means, monitoring changing of outputs indicated by the second indication stored in said first register means and outputs from a shift register in a second predetermined range including the outputs, and outputting the selection control signal, and said comparison means, when a changing point is detected in outputs from a shift register a phase position of which is prior to a shift register indicated in a second indication stored in said first register means, decreases a value of the selection control signal and, when a changing point is detected in outputs from a shift register a phase position of which is subsequent to a shift register indicated in a second indication stored in said first register means, increases a value of the selection control signal.

12. A bit position synchronizer according to claim 11, wherein said second control means responds to a slower clock than the master clock.

13. A bit position synchronizer according to claim 12, including a dividing means for dividing arbitrarily one of clock signals of a plurality of phases, generating the slower clock, and providing said slower clock to said second control means.

14. A bit position synchronizer according to claim 10, wherein the master clock is arbitrarily one of clock signals of a plurality of phases.

15. A bit position synchronizer according to claim 11, wherein the second predetermined range is substantially equal to a first predetermined range.

* * * * *